United States Patent [19]
Bearint

[11] Patent Number: 5,689,960
[45] Date of Patent: Nov. 25, 1997

[54] CONTROL CURVE FOR VARIABLE DELIVERY COMPRESSOR

[75] Inventor: David E. Bearint, Decatur, Ill.

[73] Assignee: Zexel USA Corporation, Decatur, Ill.

[21] Appl. No.: 802,115

[22] Filed: Feb. 19, 1997

[51] Int. Cl.$^6$ .................................................. G01M 19/00
[52] U.S. Cl. .............................. 62/77; 62/298; 62/278.3; 417/295
[58] Field of Search .......................... 62/77, 298, 228.1, 62/228.3, 226, 227, 239, 244, 217; 417/295, 309, 310

[56] References Cited

U.S. PATENT DOCUMENTS

| | | | |
|---|---|---|---|
| 2,169,605 | 8/1939 | Griese | 62/77 X |
| 4,989,412 | 2/1991 | Johnson | 62/77 X |
| 5,142,876 | 9/1992 | Snider et al. | 62/298 X |
| 5,364,235 | 11/1994 | Bearint | 417/295 |
| 5,492,450 | 2/1996 | Bearint et al. | 417/295 |
| 5,540,565 | 7/1996 | Bearint | 417/295 |

*Primary Examiner*—Harry B. Tanner
*Attorney, Agent, or Firm*—James E. Bradley

[57] ABSTRACT

A method for adjusting an air conditioner compressor for a particular vehicle application involves selecting the proper control curve. The control curve is a graph of suction inlet pressure verses discharge pressure. The graph has a linear portion over which increased discharge pressure decreases suction pressure. The low demand condition at which suction pressure is highest and discharge pressure lowest may result in an evaporator outlet pressure that is too high or too low. To change the evaporator outlet pressure, the control valve for the compressor is adjusted or replaced to vary the slope of the linear portion of the control curve. Varying the slope will change the maximum suction pressure to reach an optimized solution under low demand conditions. The slope is varied by changing a bias pin in the modular control valve to one of a different diameter. The bias pin is one factor that controls the opening and closing of the valve to vary the capacity of the compressor.

12 Claims, 4 Drawing Sheets

CONTROL CURVE FOR VARIABLE DELIVERY COMPRESSOR

TECHNICAL FIELD

This invention relates in general to automotive air conditioners, and in particular to a method of adjusting a variable capacity compressor for different vehicle applications.

BACKGROUND ART

A variable capacity automotive air conditioner compressor operates continuously while the air conditioner system is operating as opposed to a type that engages and disengages the compressor with a clutch. The variable capacity compressor has an intake valve which is varied by a valve actuator. A control valve supplies control pressure to the valve actuator in response to the thermal demand. The compressor must be able to deliver sufficient mass flow of refrigerant at high demand conditions in order to achieve a specified cool temperature of air being discharged by the interior blower. Also, the air conditioning system must be able to operate properly at low demand conditions. At low demand, the evaporator should be cold enough to dehumidify the air blown through, yet not so cold so as to cause moisture condensing on the coils to freeze. The temperature of the evaporator at low demand conditions depends among other things upon the suction pressure of the compressor.

A control curve for a variable delivery compressor is the relationship between suction pressure at the compressor and the imposed discharge pressure. The curve has a negative slope; that is, suction pressure decreases with increasing discharge pressure as higher ambient conditions impose an increasing thermal load on the system. For a vane-type compressor, there are two points of inflection. At the higher discharge pressure inflection point, the compressor moves from partial to full capacity. At partial capacity, the compressor control valve is capable of controlling suction pressure. At full capacity, higher ambient temperatures and increased thermal load continues to drive the suction pressure up. At the lower discharge pressure inflection point, the compressor reaches its minimum displacement condition and further reduction in ambient temperature and thermal load on the system results in the compressor pulling the suction pressure down.

The purpose of a control curve for a particular air conditioning system is to hold evaporator conditions just above the point where moisture condensing on the external surfaces of the evaporator would freeze. At low ambient conditions, there is a small thermal load imposed on the air conditioner system. The resulting mass flow of the refrigerant working fluid is correspondingly low. The pressure drop in the suction line between the evaporator and the compressor is very low, perhaps less than one psi. With increasing demand in conditions, the thermal load on the system increases as does the required mass flow rate of the refrigerant working fluid. In order to hold evaporator conditions constant, it is necessary to drive the suction pressure down to support the increasing pressure drop in the suction line.

One type of control valve for a variable capacity compressor is adjustable. The control valve can be adjusted to set a suction pressure set point (SPSP) for a vehicle application. The SPSP is a suction pressure and discharge pressure which occurs at a specified high demand operating condition. The air conditioner will be operated under a high demand condition and the control valve will be adjusted to provide the desired air temperature being discharged from the blowers. The suction pressure and discharge pressure at which the desired air temperature is reached is the SPSP. Initially, the SPSP may be set under actual operating conditions in a wind tunnel. During production, the control valve SPSP can be set on a test bench.

However, no two vehicle applications are the same. In some vehicles, the compressor and the evaporator are very close to each other, joined with a relatively short suction hose assembly. In other vehicles, there is a long tortuous path for the suction line between the evaporator and the compressor. The evaporator thermal load capabilities and condenser heat duties vary from application to application, as do customer specifications. In the past, extensive testing and design work was required for each particular vehicle application.

SUMMARY OF THE INVENTION

In this invention, a method is shown for adjusting the control valve of a variable capacity compressor for different vehicle applications, rather than having to redesign basic components of the air conditioning system. This is handled by installing the air conditioner in the vehicle and operating the vehicle under a selected high demand operating condition, such as in a wind tunnel test. The test equipment senses suction pressure, discharge pressure and grill air temperature off a blower of the air conditioner while the vehicle is being operated under the high demand operating conditions. A technician adjusts the control valve at the point at which the grill air temperature reaches satisfactory temperature, this being the SPSP.

The technician then operates the vehicle at a selected low demand operating condition and determines an evaporator outlet pressure. If the evaporator outlet pressure is either too high or too low, the technicians changes the control valve with another which has a different control curve slope of suction pressure verses discharge pressure. In one type of control valve, this is handled by changing the pressure area of the bias pin. Once changed, the technician repeats the wind tunnel test at high demand conditions and low demand conditions to reset the SPSP and determine if the changed slope provides a desired evaporator temperature under low demand conditions. This iterative process is preferably performed with a modular control valve which can be readily removed after each test and replaced with another having a different control curve slope.

BEST MODE FOR CARRYING OUT THE INVENTION

Figure 1:
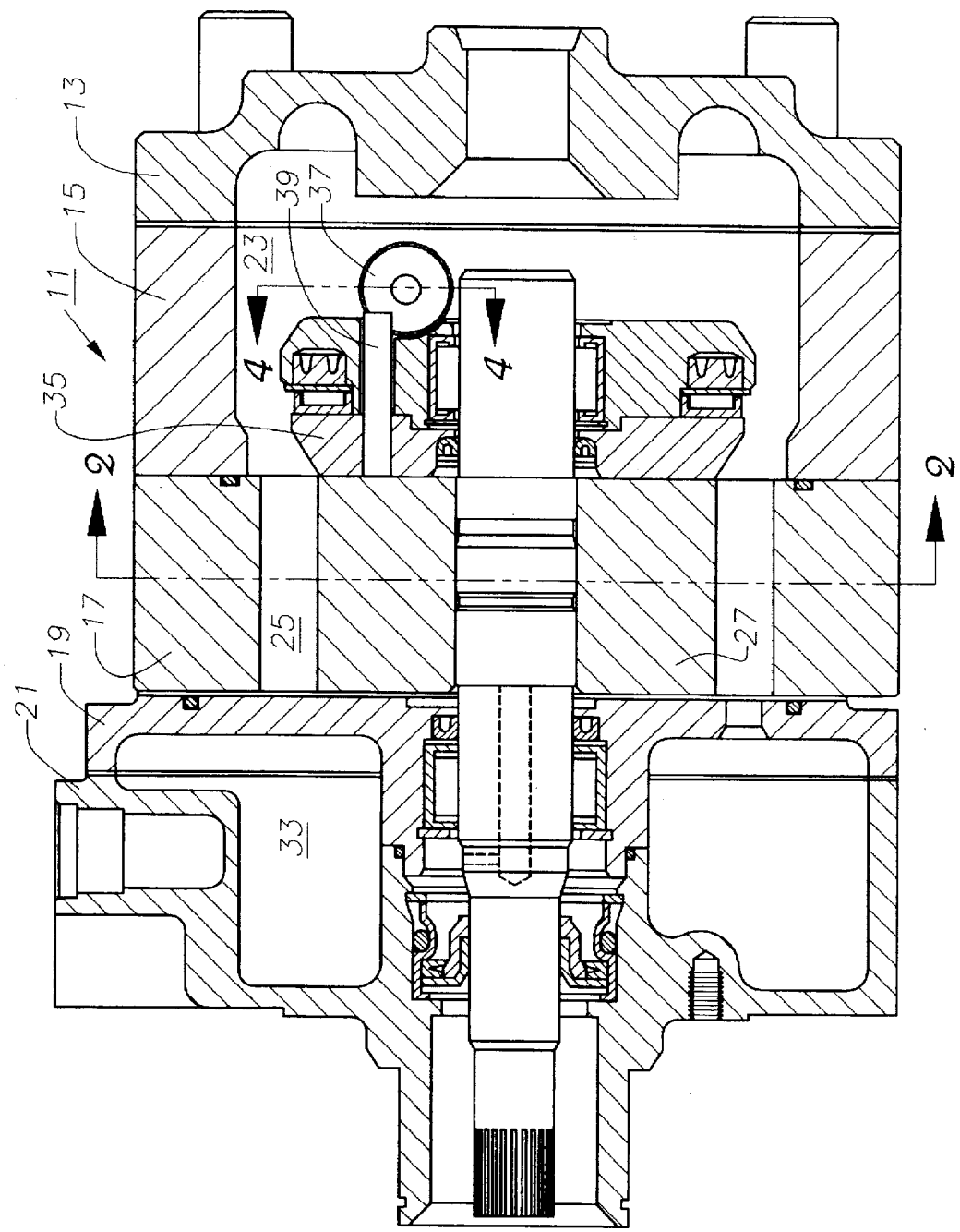
FIG. 1 is a sectional view illustrating a compressor for use with the method of this invention.
Figure 2:
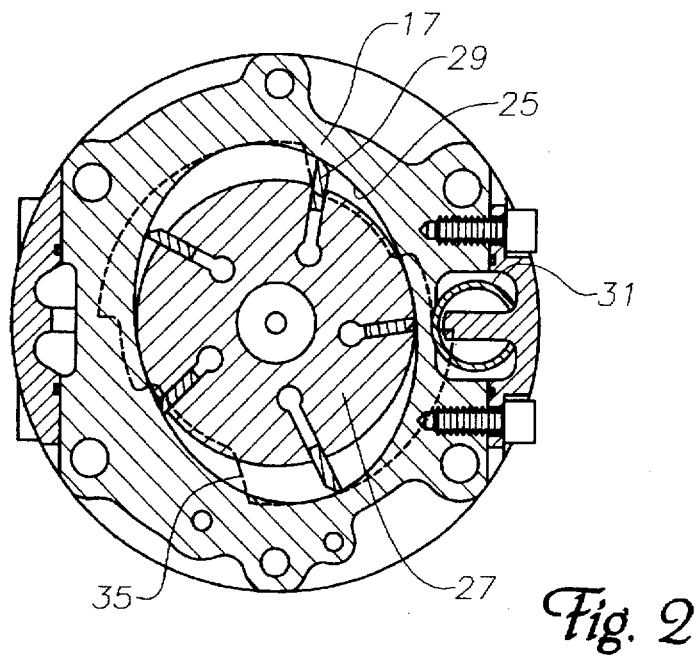
FIG. 2 is a sectional view of the compressor of FIG. 1, taken along the line 2—2 of FIG. 1.

Referring to FIG. 1, compressor 11 is of a variable capacity type. The particular embodiment shown has a rear head 13, a rear side block 15, a cylinder block 17, a front side block 19 and a front head 21. These various components are bolted together. An intake chamber 23 is located in cavities between the rear head 13 and rear side block 15. Intake chamber 23 leads to a compression chamber 25 in cylinder block 17. As shown in FIG. 2, compression chamber 25 is oval in shape and contains a cylindrical rotor 27. A plurality of vanes 29 extend outward from rotor 27 and are moveable generally radially relative to the axis of rotor 27. This causes refrigerant located in chamber 25 to be compressed and forced out discharge valves 31 into a discharge chamber 33 (FIG. 1).

Figure 3:
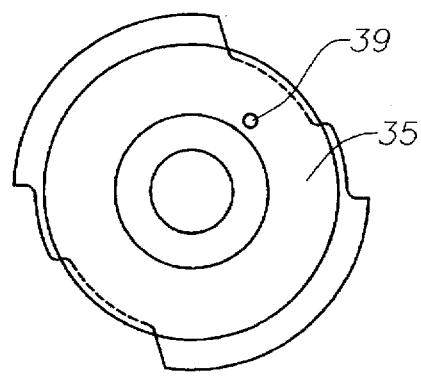
FIG. 3 is a front view of a rotary intake valve for the compressor of FIG. 1.

The mass flow of refrigerant through compressor 11 is varied according to demand. Varying the flow is handled by a rotary valve 35, shown by dotted lines in FIG. 2 and solid lines in FIG. 3. When rotated to different positions, rotary valve 35 will increase and reduce the amount of refrigerant flow into compressor chamber 25.

Figure 4:
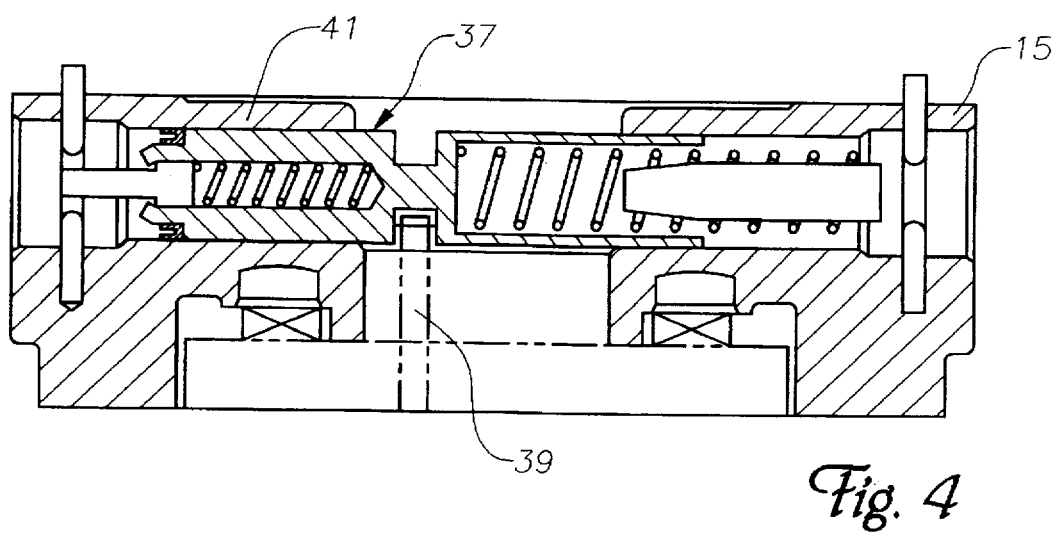
FIG. 4 is a sectional view of the compressor of FIG. 1, taken along the line 4—4 of FIG. 1.

A valve actuator 37, shown also in FIG. 4, rotates rotary valve 35. Valve actuator 37 may be of various types, and in the embodiment shown moves linearly to rotate rotary valve 35 by means of a pin 39. Valve actuator 37 has a piston 41 on one end which is supplied with control pressure for causing it to move linearly in response to the control pressure supplied.

Figure 5:
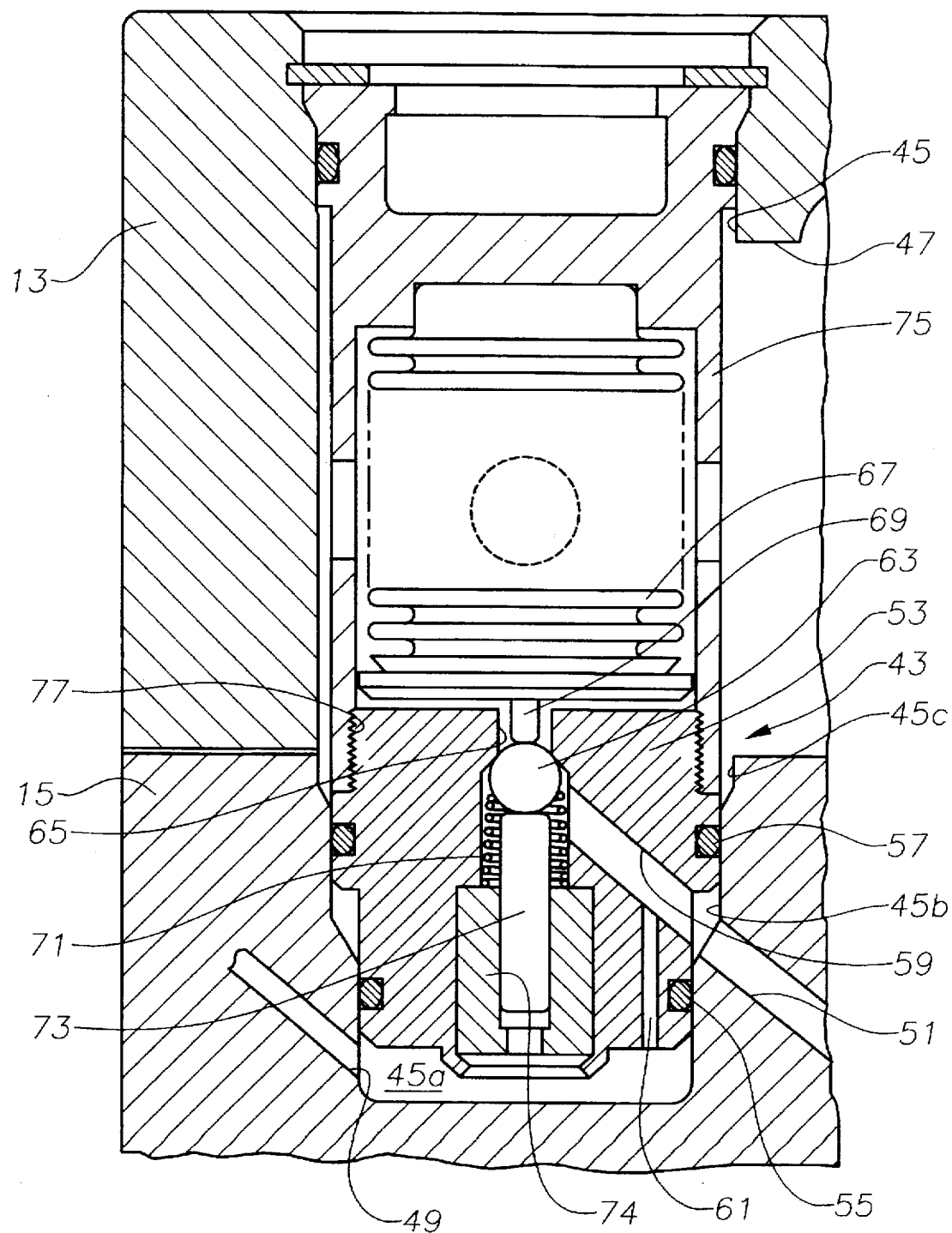
FIG. 5 is a sectional view of a portion of the compressor of FIG. 1, showing the control valve.

Referring to FIG. 5, control valve 43 supplies varied control pressure to one side of piston 41 (FIG. 4) to vary the position of rotary valve 35. Control valve 43 is located in a cavity 45 in rear side block 15 and rear head 13. Cavity 45 has a discharge pressure portion 45a, a central control pressure portion 45b, and an upper suction pressure portion 45c. A suction pressure port 47 leads to suction pressure portion 45c and exposes control valve 43 to compressor suction pressure. A discharge pressure port 49 communicates discharge pressure from discharge chamber 33 (FIG. 1) to cavity discharge pressure portion 45c. A control pressure port 51 leads from cavity control pressure portion 45c to piston 41 (FIG. 4).

Control valve 43 includes a body 53 which inserts sealingly into cavity 45. A seal 55 on body 53 separates cavity discharge pressure portion 45a from control pressure portion 45b. A seal 57 on body 53 separates control pressure portion 45b from suction pressure portion 45c. Body 53 has a control pressure outlet 59 leading to control pressure port 51. Body 53 has a metered orifice 61 which is always open and which communicates discharge pressure port 49 with control pressure outlet 59.

A moveable ball element 63 is carried in body 53. Ball 63 will move between open and closed positions, opening and closing a suction pressure inlet 65 in body 53. An evacuated bellows 67, which has its exterior exposed to suction pressure, has a stem or rod 69 that tends to urge ball 63 from the closed position to an open position. A spring 71 acts on ball 63 in the opposite direction to urge ball 63 to the closed position. Also, a bias pin 73 acts on ball 63 to urge it to the closed position. Bias pin 73 is slidingly carried in the bore of a cylinder 74 that is inserted into body 53. The lower end of cylinder 74 is open, exposing discharge pressure to the lower end of bias pin 73. Bias pin 73 is cylindrical and has a pressure area that is proportional to its diameter.

Control valve 43 also has an end cap 75, which in the embodiment shown, is a tubular element that encloses bellows 67. End cap 75 in the embodiment shown has threads 77 that secure it to body 53. End cap 75 bears against an end of bellows 67 opposite rod 69 to change its effective length. Moving end cap 75 away from body 53 increases the bellows effective length and decreases the amount of force applied by rod 69 against ball 63 for a given suction pressure. The length can be changed in the embodiment shown by rotating end cap 75 relative to body 53. Other means to vary the effective length are also possible.

Figure 7:
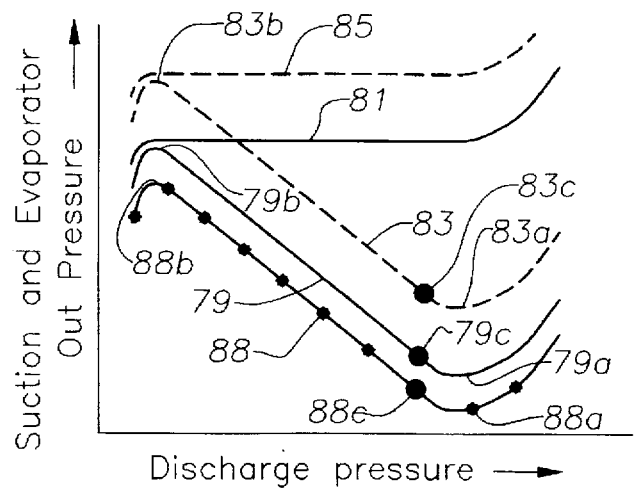
FIG. 7 is a graph illustrating three control curves for three different vehicle applications, each using the same compressor and control valve.

Referring now to FIG. 7, control curve 79 represents the compressor of FIG. 1 being operated under various conditions. An increase in demand will cause the discharge pressure to increase and will cause a decrease in the suction pressure. At the higher discharge pressure inflection point 78a, a further increase in discharge pressure will result in the suction pressure beginning to increase as well. At the lower discharge pressure inflection point 78b, the maximum suction pressure will reached. This occurs under light thermal load conditions. Control curve 79 is linear between inflection points 78a, 78b, having a negative slope.

Control curve 79 is plotted by conducting an actual test in a wind tunnel under specified high demand conditions. For example, the conditions may be 100° F. with a wind and road speed at 50 mph and 40% relative humidity. The suction pressure and the discharge pressure will be monitored by measuring the temperature of the air conditioner fan or blower discharge at the grill inside the vehicle. The technician will adjust the effective length of bellows 67 until the desired grill air temperature is reached. The adjustment is handled by using a screwdriver or other tool to rotate cap 75 relative to body 53. This may be done while the air conditioning system is operating and the wind tunnel temporarily turned off. Once the desired grill air temperature is reached, the particular discharge pressure and suction pressure will be referred as the SPSP, shown by point 78c on control curve 79. SPSP 78c will be near inflection point 78a and it will be the point at which ball 63 will be just closing to cut off any communication of suction pressure to the control pressure.

The technician then lowers the thermal demand by reducing the temperature in the wind tunnel test. Because of less heat transfer in the evaporator, the compressor discharge pressure will automatically begin to drop, causing bellows rod 69 to begin pushing ball 63 off of its seat, admitting suction pressure from passage 65 to control pressure passage 59. Reducing the pressure at control pressure port 51 causes valve actuator 37 (FIG. 4) to rotate rotary valve 35 to reduce the flow of intake refrigerant. Lessor intake flow increases the suction pressure. Control valve 43 thus will modulate or control the suction pressure linearly relative to the discharge pressure between inflection points 78a, 78b because it will be able to move ball 63 on and off its seat.

The technician will continue to lower the thermal demand on the system in the wind tunnel test until the lowest ambient conditions are reached. At this point, which is near inflection point 78b, the evaporator outlet pressure 81 will be only slightly greater than the compressor suction inlet pressure because of the low mass flow rate through the system. Evaporator outlet pressure 81 is shown idealized and is substantially constant through the demand operating conditions between inflection points 78a, 78b. The evaporator temperature is a function of the evaporator outlet pressure 81. If the outlet pressure 81 is too low, the low temperature of the evaporator will cause the moisture condensing on the external surfaces of the evaporator to freeze at low demand conditions. If evaporator outlet pressure 81 is too high, the evaporator temperature under low demand conditions may be too high to cause adequate condensation of moisture in the air for dehumidifying the air at low demand conditions. Through good design of the other components of the air conditioner system, a desirable control curve 79 for a particular vehicle application may be achieved.

Although control curve 79 may be appropriate for one vehicle application, the same compressor installed on another type of vehicle may not be adequate even though the expected thermal loads are similar. Control curve 83 is a plot of the same compressor used for plotting control curve 79, but installed in another type of vehicle. For example, in the vehicle for control curve 83, the length of the hose between the evaporator outlet and the compressor inlet may be much smaller than with the equipment of control curve 79. The evaporator thermal load capabilities and condenser heat duties also vary from one vehicle application to another type of vehicle.

Control curve 83 has the same shape as control curve 79, having two inflection points 83a, 83b. A SPSP point can be achieved for the second vehicle application in the same manner as the first vehicle and for simplicity, SPSP 83c is shown set at the same discharge pressure as SPSP 79c, although it need not be. The technician operates the second vehicle in a wind tunnel under high demand conditions and adjusts the effective length of bellows 67 until the desired air temperature is reached to set SPSP 83c. Note that with control curve 83, SPSP 83c has a higher suction pressure than SPSP 79c, although the discharge pressure is set the same. This likely indicates that the hose between the evaporator outlet and the compressor inlet is shorter than with the first vehicle. The technician then operates the second vehicle at low demand conditions, and plots a maximum suction pressure inflection point 83b. Through the operating range between inflection points 83a, 83b, compressor control curve 83 will be linear on the second vehicle with the same slope as and offset from control curve 79 of the first vehicle. However, the higher maximum suction pressure 83b occurring at low demand will result in a higher evaporator outlet pressure 85. Evaporator outlet pressure 85 may result in the evaporator temperature being too high to adequately dehumidify the air flowing across the evaporator under low demand conditions.

Additionally, operating the same compressor in a third vehicle could produce a control curve 87 with the same slope as control curve 79 of the first vehicle but offset in the other direction. It would have inflection points 87a, 87b, the same slope as control curve 79, and could have the same discharge pressure at SPSP 87c as SPSP 79c. The suction pressure at SPSP 87c would be less than at SPSP 79c. This would result in a lower maximum suction pressure 87b and lower evaporator outlet pressure (not shown) than evaporator outlet pressure 81. The lower evaporator outlet pressure may result in freezing of the moisture on the evaporator during low demand conditions.

Figure 6:
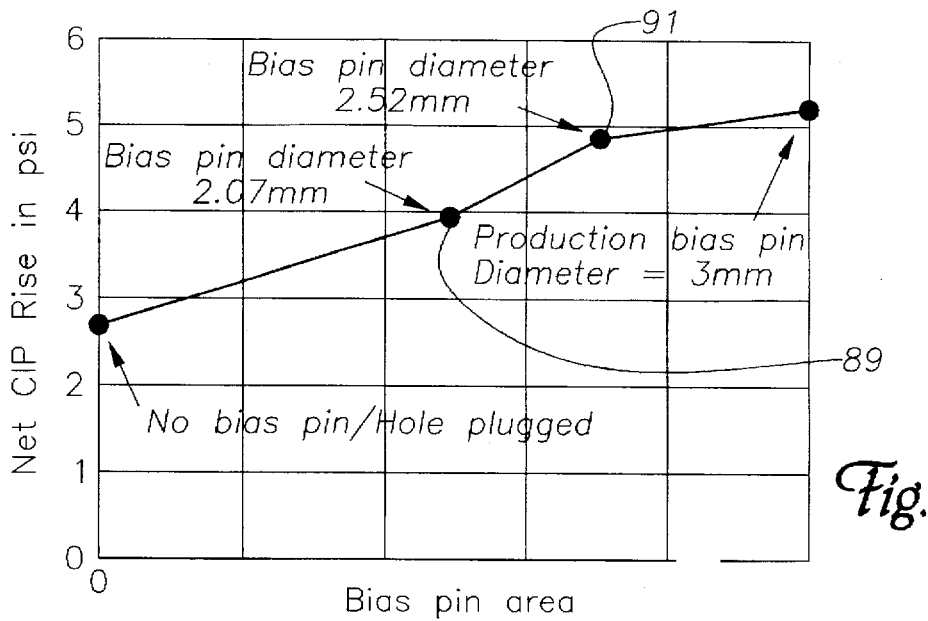
FIG. 6 is a graph illustrating the effect produced on suction pressure increase by different bias pin diameters for the control valve of FIG. 5.

FIG. 6 illustrates the effect of changing the diameter of bias pin 73 to change the slope of the control curve of a variable capacity compressor of the type shown in FIGS. 1–5. FIG. 6 was plotted by dropping the discharge pressure, in this instance from 200 psi to 100 psi, and recording the rise in suction pressure for that drop. For example, for a bias pin 73 diameter of 2.07 mm, when the discharge pressure was reduced from 200 psi to 100 psi, the suction pressure rose by 4 psi, as indicated by point 89. For a 2.52 mm bias pin 73, the suction pressure rose approximately 4.9 psi as indicated by point 91, when the compressor discharge pressure was reduced from 200 psi to 100 psi. This test indicated that changing the diameter of bias pin 73 will change the slope of control curve 79.

Figure 8:
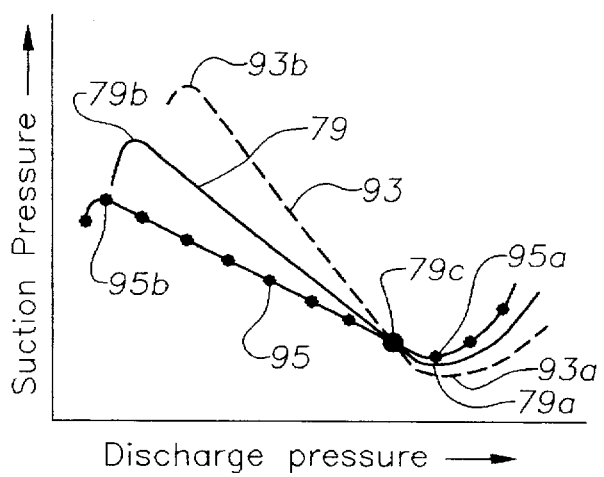
FIG. 8 is a graph illustrating three control curves for one vehicle application, each control curve was made using the same compressor, but each having a different control valve.

In FIG. 8, the two control curves 93, 95 were made with the same compressor and the same vehicle as employed as when producing control curve 79, however using a different control valve 43 (FIG. 5). The new control valve 43 is changed to provide a different slope of suction pressure verse discharge pressure than it provided for control curve 79. As explained above, this is accomplished by changing the diameter of bias pin 73 (FIG. 5) to a different diameter. This can be handled preferably by removing the entire modular control valve 43 and inserting another with a different diameter bias pin 73. Alternately, to supply the new control valve 43, the technician could remove control valve 43, withdraw cylinder 74 and bias pin 73 and insert a cylinder 74 and bias pin 73 with a different diameter. For simplicity, the set point 79c for all three control curves 79, 93 and 95 is set at the same point, although it need not be. The set point 79c for curves 93 and 95 could be set at a test bench or alternately in a wind tunnel.

For control curve 93, the new modular control valve 43 has a bias pin 73 (FIG. 5) having a larger diameter than the control valve 43 employed when plotting control curve 79. The larger pressure area of bias pin 73 results in more suction pressure change for a given discharge pressure change, thus provides a control curve with a slope that is steeper. Curve 93 is plotted in a wind tunnel test under high demand conditions to determine inflection point 93a, which is the minimum suction pressure point. Note that inflection point 93a has a slightly lower suction pressure than inflection point 79a. The vehicle then is operated under low demand conditions to determine the rest of control curve 93. The greater slope of control curve 93 causes it to have a significantly higher inflection point 93b than inflection point 79c with the smaller diameter bias pin 73. This produces a higher evaporator outlet pressure than curve 85. The higher evaporator outlet pressure may be desired in the event freezing conditions on the evaporator exist at low demand conditions for the vehicle control curve 79. Maintaining the same SPSP 79c causes curve 93 to appear to be rotated a few degrees clockwise about SPSP 79c. For control curve 95, bias pin 73 (FIG. 5) was changed for a bias pin 73 having a smaller diameter. The smaller pressure area of bias pin 73 results in less suction pressure change for a given discharge pressure change, thus provides a control curve with a slope that is not as steep as control curve 79. Curve 95 is plotted in a wind tunnel test under high demand conditions to determine inflection point 95a. Note that inflection point 95a has a slightly higher suction pressure than inflection point 79a. The vehicle then is operated under low demand conditions to determine the rest of control curve 93 and inflection point 95b. The lesser slope of control curve 95 causes it to have a significantly lower inflection point 95b than inflection point 79a with the larger bias pin 73. This produces a lower evaporator outlet pressure than curve 79. The lower evaporator outlet pressure provides more dehumidification than when the compressor when operated under control curve 79. Control curve 95 has an appearance of being rotated a few degrees counterclockwise about SPSP 79c.

In using the method of this invention, when a new vehicle application is presented, the technician will install air conditioning equipment that calculations show to be adequate. Possibly the SPSP will be adjusted in a bench test to an expected level. The technician will place the vehicle in a wind tunnel test under high demand conditions and determine the exact SPSP, such as SPSP 79c (FIG. 8). After setting SPSP 79c, the technician will place the vehicle under low demand conditions to determine the maximum suction pressure and minimum discharge pressure inflection point 79b.

If the maximum suction pressure 79b produces an evaporator temperature that is not within a desired range, the technician will remove modular control valve 43 and replace it with a modular control valve which has a different slope, either steeper or shallower, depending upon whether the evaporator temperature at the low demand condition was too low or too high. If a lower temperature for the evaporator is needed at low demand conditions, the diameter of bias pin 73 will be less, providing a shallower slope, such as control curve 95 (FIG. 8). If a higher temperature for the evaporator is needed at low demand conditions, the diameter of bias pin 73 will be greater, providing a steeper slope, such as control curve 93. The technician then determines or sets the SPSP of the compressor with the new control valve 43, preferably by monitoring the blower grill temperature and adjusting the point at which the ball valve will begin to open by adjusting the effective length of bellows 67. Although the SPSP points of curves 93, 95 are shown to be the same as SPSP 79c, they likely will differ in actual application. The technician then checks to determine under low load demand conditions whether the evaporator outlet pressure is within the correct range. If not, the technician repeats the iterative process described above until the desired control curve has been achieved.

The invention has significant advantages. It allows an air conditioner compressor to be utilized for different vehicle applications without extensive redesign because of different lengths of the evaporator outlet hose and other conditions. The modular control valve allows technicians to quickly replace the control valve with other sizes to arrive at an optimized control curve.

While the invention has been shown in only one of its forms, it should be apparent to those skilled in the art that it is not so limited but is susceptible to various changes without departing from the scope of the invention.

I claim:

1. A method of adjusting an air conditioner compressor for a selected vehicle, the compressor having an intake valve which is varied by a valve actuator controlled by control pressure supplied by an adjustable control valve, the method comprising:

(a) installing the compressor in the vehicle with a compressor having a first control valve and operating the vehicle under a selected high demand operating condition;

(b) sensing suction pressure, discharge pressure, and grill air temperature off an air conditioner blower while the vehicle is being operated under the high demand operating condition;

(c) adjusting the first control valve while it remains installed in the compressor to provide a desired suction pressure set point at which the grill air temperature at the high demand operating condition is satisfactory;

(d) operating the vehicle at a selected low demand operating condition, and determining evaporator outlet pressure at the low demand operating condition; and (e) if the evaporator outlet pressure is not a desired magnitude, removing the first control valve from the compressor and installing in the compressor a second control valve which has a control curve with a different slope of suction pressure versus discharge pressure than the first control valve, then repeating steps (b) through (e) until the desired suction pressure set point is reached and the desired evaporator outlet pressure is reached.

2. The method according to claim 1, wherein steps (b) and (c) are performed before step (d).

3. The method according to claim 1, wherein if step (d) indicates that the evaporator outlet pressure is too low at the low demand operating condition, in step (e) the second control valve is provided with a control curve which has a steeper slope than the first control valve.

4. The method according to claim 1, wherein if step (d) indicates that the evaporator outlet pressure is too high at the low demand operating condition, in step (e) the second control valve is provided with a control curve which has a shallower slope than the first control valve.

5. A method of adjusting an air conditioner compressor for a selected vehicle, the compressor having an intake valve which is varied by a valve actuator controlled by control pressure supplied by a control valve, the control valve having a discharge port for receiving compressor discharge pressure, a suction port for receiving compressor suction pressure, a control pressure port which communicates with the suction pressure port and the discharge pressure port for supplying the control pressure to the valve actuator, a movable valve element which moves between open and closed positions to vary the control pressure by opening and closing communication of the suction pressure to the control pressure port, a bellows which has an exterior exposed to suction pressure and an end which acts against the valve element to urge it to an open position in response to changes in the effective length of the bellows, and a movable bias pin which has a pressure area exposed to the discharge pressure and acts against the valve element in a direction opposite to the bellows to urge the valve element to the closed position, the method comprising:

(a) installing the compressor in the vehicle and operating the vehicle under a selected high demand operating condition;

(b) sensing suction pressure, discharge pressure, and grill air temperature off an air conditioner blower while the vehicle is being operated under the high demand operating condition;

(c) adjusting the effective length of the bellows to provide a desired suction pressure set point at which the grill air temperature at the high demand operating condition is satisfactory;

(d) operating the vehicle at a selected low demand operating condition and determining an evaporator outlet pressure;

(e) if the evaporator outlet pressure is not a desired magnitude at the low demand operating condition, changing the pressure area of the bias pin and repeating steps (b) through (e) until the desired suction pressure set point is reached and the evaporator outlet pressure is at the desired magnitude.

6. The method according to claim 5, wherein if in step (d) the evaporator outlet pressure is too low, step (e) comprises increasing the pressure area of the bias pin.

7. The method according to claim 5, wherein if in step (d) the evaporator outlet pressure is too high, step (e) comprises decreasing the pressure area of the bias pin.

8. The method according to claim 5, wherein steps (b) and (c) are performed before step (d).

9. A method of adjusting an air conditioner compressor for a selected vehicle, the compressor having an intake valve which is varied by a valve actuator controlled by control pressure, the method comprising:

(a) providing the compressor with a control valve cavity having a discharge port for receiving compressor discharge pressure, a suction port for receiving compressor suction pressure, and a control pressure port which supplies the control pressure to the valve actuator;

(b) inserting into the control valve cavity a first modular control valve having a movable valve element which moves between open and closed positions to vary the control pressure by opening and closing communication of the suction pressure to the control pressure port, a bellows which has an exterior exposed to suction pressure and an end which acts against the valve element to urge it to an open position in response to changes in the effective length of the bellows, and a movable bias pin which has a pressure area exposed to the discharge pressure and acts against the valve element in a direction opposite to the bellows to urge the valve element to the closed position;

(c) installing the compressor in the vehicle with the first modular control valve and operating the vehicle under a selected high demand operating condition;

(d) sensing suction pressure, discharge pressure, and grill air temperature off an air conditioner blower while the vehicle is being operated under the high demand operating condition;

(e) adjusting the effective length of the bellows to provide a desired suction pressure set point at which the grill air temperature at the high demand operating condition is satisfactory;

(f) operating the vehicle at a selected low demand operating condition and determining an evaporator outlet pressure; and (g) if the evaporator outlet pressure is not a desired magnitude, removing the first modular control valve from the cavity, and installing a second modular control valve which has a bias pin with a different pressure area than the bias pin of the first modular control valve; and repeating steps (c) through (g) until the desired suction pressure set point is reached and the evaporator outlet pressure is at the desired magnitude.

10. The method according to claim 9, wherein if the evaporator outlet pressure determined in step (f) is too low, then step (g) comprises providing the second modular control valve with a bias pin having a greater pressure area than the first modular control valve.

11. The method according to claim 9, wherein if the evaporator outlet pressure determined in step (f) is too high, then step (g) comprises providing the second modular control valve with a bias pin having a lesser pressure area than the first modular control valve.

12. The method according to claim 9, wherein steps (d) and (e) are performed before step (f).

* * * * *